United States Patent [19]

Prill et al.

[11] 4,385,300
[45] May 24, 1983

[54] DIGITAL TACAN PROCESSOR

[75] Inventors: Robert S. Prill, Parsippany; Ronald Y. Paradise, Hillsdale; James W. Lang, Parsippany; Peter J. Tufano, Wayne, all of N.J.

[73] Assignee: The Singer Company, Little Falls, N.J.

[21] Appl. No.: 218,873

[22] Filed: Dec. 22, 1980

[51] Int. Cl.³ .............................................. G01S 1/44
[52] U.S. Cl. ................................ 343/106 R; 364/451
[58] Field of Search .................. 343/106 R; 364/451

[56] References Cited

U.S. PATENT DOCUMENTS

3,897,031 7/1975 Moses et al. ........................ 364/451
3,940,763 2/1976 Paradise ........................ 343/106 R

Primary Examiner—Theodore M. Blum
Attorney, Agent, or Firm—Morris Liss; Thomas W. Kennedy

[57] ABSTRACT

A stand-alone digital processor based system includes a five-output state digital filter provided with magnitude and time data relative to a received TACAN signal. Threshold detection is provided for validating the received signal magnitude. The filter outputs produce phase signals which are combined in the digital processor, in accordance with an algorithm, to generate bearing data. The bearing data is stored and scaled prior to updating a display.

8 Claims, 7 Drawing Figures

FIG. 3   BEARING TRACKER 34

FIG. 4  BEARING FILTER 38

FIG. 7
REFERENCE BURST TRACKER SUBROUTINE

DIGITAL TACAN PROCESSOR

BACKGROUND OF THE INVENTION

This invention relates to aircraft navigation in general and more particularly to a digital TACAN system utilizing a stand-alone digital processor.

TACAN equipment is used on most military aircraft to provide an indication of the distance and bearing to any selected TACAN station. In a TACAN system a ground station transmits TACAN pulses at a rate of approximately 2700 pulses per second. The ground station antenna rotates 15 times per second and has an antenna directivity pattern which has a cardioid component to it. This causes the pulses received by the aircraft to have a 15 hertz modulation of plus or minus 20 percent amplitude and a phase which depends upon the aircraft's bearing with respect to the TACAN station. The transmitter also sends a reference pulse code once each antenna cycle, at a fixed point in the antenna rotation, to establish an absolute reference phase. The aircraft equipment determines the bearing by comparing the phase of the amplitude modulated signal with the reference phase pulses. For further accuracy, a ninth harmonic is also superimposed on the antenna directivity pattern producing a 135 hertz amplitude modulation. This will be present at the receiver at phase coherence with the 15 hertz modulation described above and permits making a finer determination of bearing in a manner similar to that used to older two-speed servo systems.

The most relevant prior art known to the inventors is the digital TACAN processor disclosed in U.S. Pat. No. 3,940,763 having the same assignee as the present application. The referenced patent discloses a signal processor which can be implemented using a general purpose computer or special purpose digital hard wire system to perform only the TACAN processing function. The system of the patent employs the technique of a least square recursive (Kalman) filter to update the current bearing estimates with each new data input. In performing the bearing computation, a Kalman filter provides a continuous estimate of the reference frequency ω and the reference phase θ. A second Kalman filter acting as a bearing signal tracker accepts amplitude data, data from the first filter and, also, the time of arrival of each bearing pulse and updates five-state variables related to the amplitude and phase of the 15 and 135 hertz modulations and a DC amplitude component which gives the average amplitude of the modulated bearing pulses. A bearing computer uses the outputs of the bearing signal tracker and the reference phase tracker to compute the final bearing to be displayed to a pilot.

Although the system of the described prior art patent operates satisfactorily, the throughput demands made on the computing hardware to process all incoming TACAN pulses are high and result in objectionable hardware complexity and cost. In practice, it has been found desirable to reduce the number of TACAN pulses processed to minimize hardware complexity with the attendant compromise in performance.

SUMMARY OF THE INVENTION

The present invention utilizes a newly developed digital bearing filter designed to generally reduce the hardware complexity and cost. The key feature of the invention is that all available incoming TACAN signal pulses can now be processed economically together with immensely improved performance. In particular, the design of the invention is directed at improving performance for the worst case limits of operation, such as combination of low modulation at low signal levels with 15 degrees phase offset (angle between the 15 Hz and 135 Hz components of a TACAN bearing signal envelope), and bearing rates up to 20 degrees per second. In addition, intermittent display anomalies (40 degrees sector jumps) due to discontinuities in the received signal are more readily eliminated. All these advantages are realized by use of a low cost stand-alone digital processor which can be implemented with conventional digital logic custom Large Scale Integrated (LSI) logic, microcomputers or combinations thereof.

The above-mentioned objects and advantages of the present invention will be more clearly understood when considered in conjunction with the accompanying drawings, in which:

DETAILED DESCRIPTION OF THE INVENTION

Figure 1:
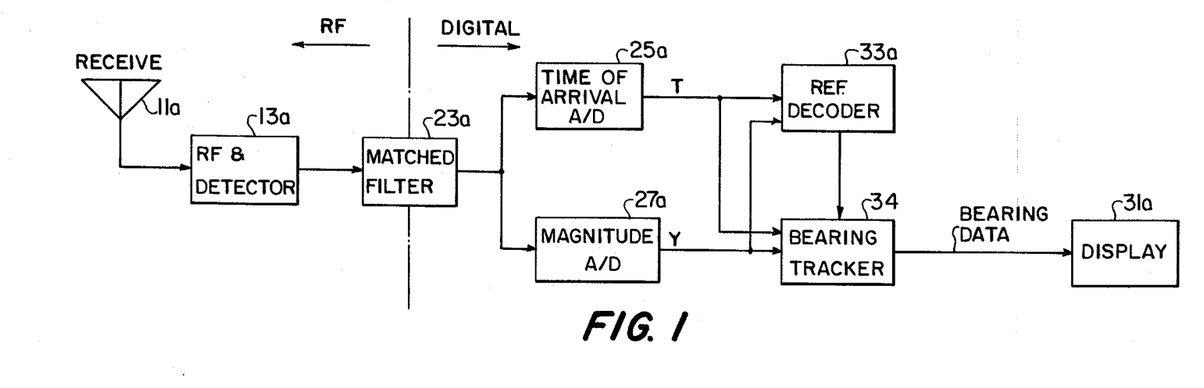
FIG. 1 is a basic block diagram of the present invention.

An overall block diagram of the present TACAN digital system is shown in FIG. 1. All of the basic blocks of the diagram, with the exception of the bearing tracker 34, correspond with those shown in FIG. 1 of U.S. Pat. No. 3,940,763. For convenience, blocks in FIG. 1 of the present application which are similar to those of the patent have the suffix letter "a" appended to common reference numerals.

Bearing information transmitted from a ground station and containing the 15 hertz, 135 hertz and reference pulse information described above is received by a conventional receiving antenna 11a and provided to an RF and detector stage 13a. The output of RF and detector stage 13a is provided to a matched filter 23a. These portions of the system are identical to those found in a conventional TACAN system and will not be discussed in detail further herein.

The output of the filter 23a is provided to a first analog-to-digital converter 25a where the information is encoded to provide a time of arrival output. The converter may simply be a conventional high frequency oscillator or clock and counter. The counter will count the number of clock pulses between TACAN reference pulses. Each time a new pulse is received, the oscillator counter output will be gated out. The time difference between pulses, which is a quantity of interest, can be computed from this as will be seen below. The signal from filter 23a is also provided to a second analog-todigital converter 27a which encodes the signal's magnitude. This converter will be of the conventional type which senses magnitude, such as a peak detector, along with a conventional analog-to-digital converter, i.e., it will sample, hold and convert the amplitude of each pulse received.

A ground station sends a series of coded pulses to identify the reference phase. The reference decoder 33a contains conventional decoding circuits to sense this code and provide an output each time it occurs. The output from the decoder 33a generates a distinct "tag" output signal for each corresponding reference pulse, be it a main, auxiliary, or squitter pulse from the TACAN ground station.

The bearing tracker 34, which provides the major improvement of the present invention, receives the tag information, along with data from the analog-to-digital converters 25a and 27a to generate real time bearing information provided to a conventional pilot display 31a.

Figure 2:
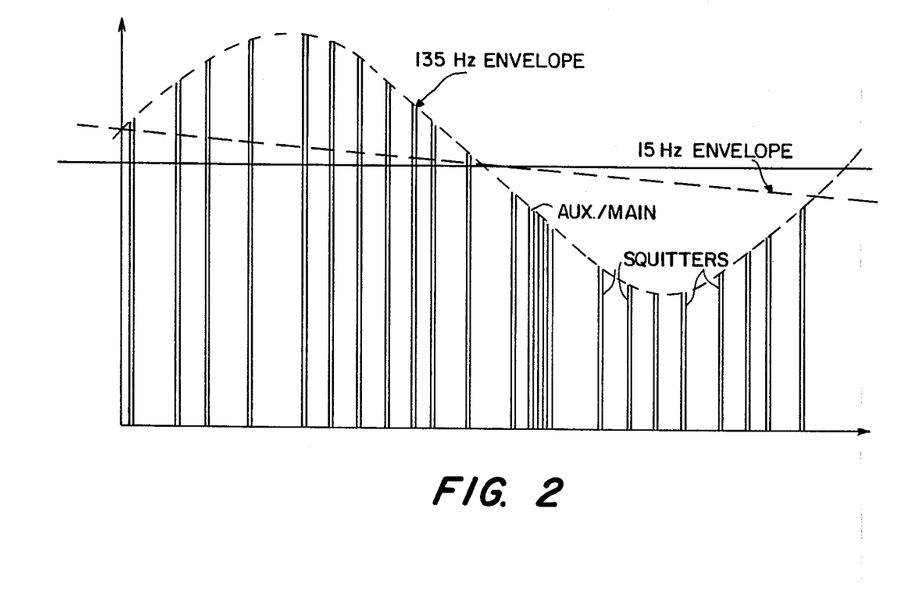
FIG. 2 is a graph showing one cycle of the 135 Hz envelope of a received TACAN signal.

FIG. 2 illustrates one cycle of a typical TACAN signal primarily modulated by a 135 Hz envelope with a 15 Hz envelope superimposed thereon. The latter frequency is equal to the rotational frequency of a TACAN ground station antenna. It should be emphasized at this point that, in a preferred embodiment of the invention, specific frequencies are disclosed inasmuch a they are standardized for TACAN operation. However, the invention may be utilized at other operating frequencies. For TACAN operation there are approximately 20 squitter bursts for each auxiliary burst. In normal operation, there is an auxiliary burst for every 40 degrees of the TACAN signal. Further, a main burst occurs during each 360 degrees of the signal. In effect, the auxiliary bursts may be considered as precisely indexing the position of a main burst inasmuch as eight auxiliary bursts occur at 40 degrees intervals for every main burst. The zero crossover axis for the 15 Hz envelope is dependent upon a setting of an automatic gain control within the RF section of the system (FIG. 1), this being a conventional approach. A main burst will occur when the TACAN ground signal corresponds with a due east bearing.

Figure 3:
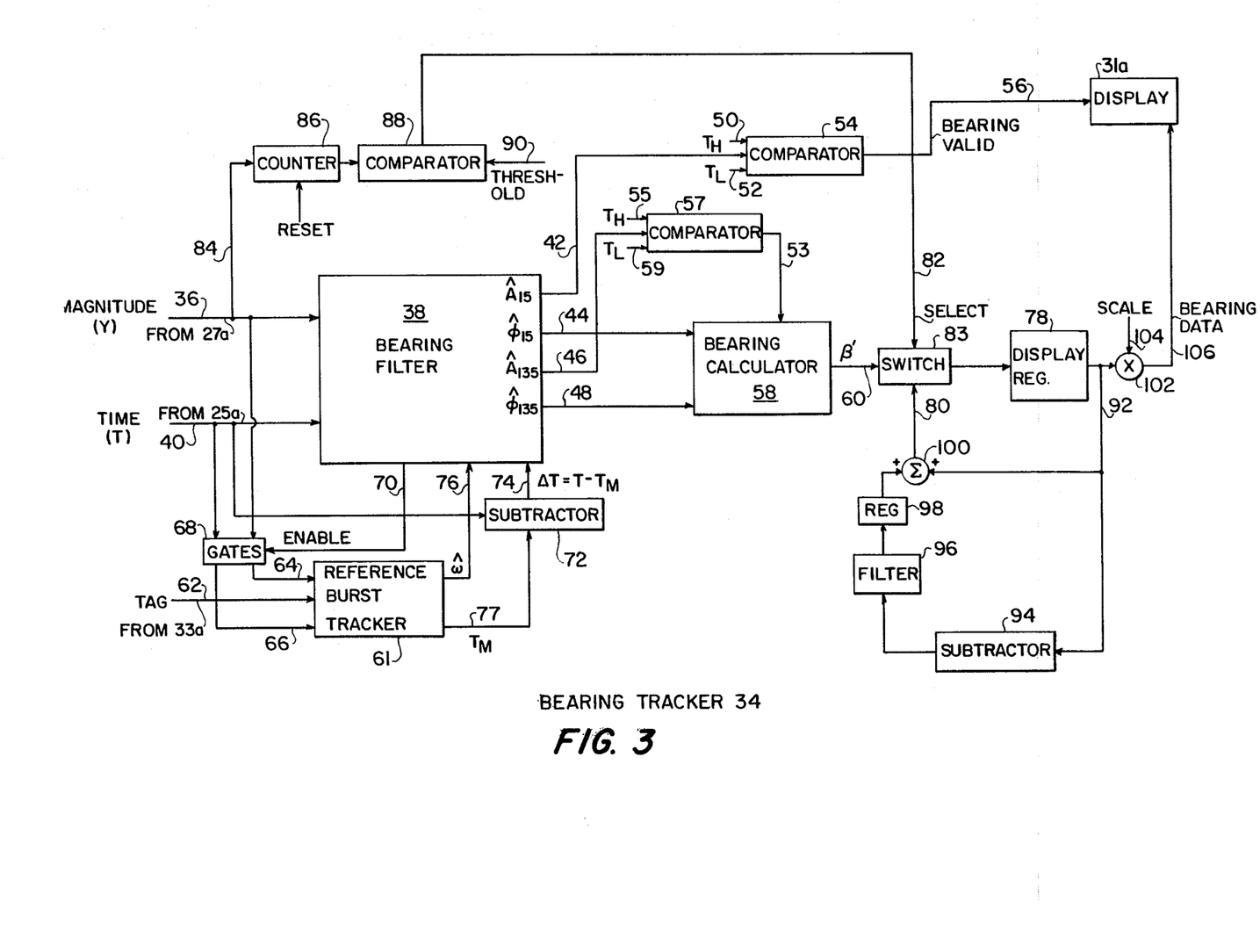
FIG. 3 is a block diagram of a bearing tracker as utilized in the present invention.

FIG. 3 is a detailed block diagram of the bearing tracker, indicated by reference numeral 34 in FIG. 1. The bearing tracker is the primary point of distinction between the present invention and that of the prior art. As previously mentioned, the purpose of the tracker is to generate reliable real time bearing information which is then provided to a pilot display 31a. The implementation of bearing data generation is accomplished by use of conventional digital logic (LSI) or microprocessors and does not rely upon an aircraft general purpose computer. Magnitude information from a received TACAN signal appears along lead 36 and is derived from the magnitude analog-to-digital converter 27a. Corresponding time information appears along lead 40 and is derived from the time of arrival analog-to-digital converter 25a. The purpose of the bearing filter 38 is to filter the magnitude and time information from the 135 Hz and the 15 Hz signals so that reliable bearing data may be displayed. The bearing filter 38 will be discussed in greater detail in connection with FIG. 4. However, it should be noted that the four outputs therefrom are as follows: $\hat{A}_{15}$ and $\hat{\theta}_{15}$ along respective leads 42 and 44, corresponding to calculated magnitude and phase data relating to the 15 Hz envelope; $\hat{A}_{135}$ and $\hat{\theta}_{135}$ appearing on leads 46 and 48, correspond to calculated magnitude and phase data relating to the 135 Hz envelope. A comparator 54 is provided with preset high and low threshold values at 50 and 52, respectively, so that the output $\hat{A}_{15}$ may be tested to see whether its value resides within a "window" between the high and low threshold values. If this is indeed the case, then the bearing data to be processed by the system is determined to be valid and a valid signal is generated along lead 56 for display in an appropriate manner, such as a lamp indicator, which is frequently incorporated within display 31a. A second comparator 57 is also provided with high and low threshold values at inputs 55 and 59, respectively. This creates a window for comparing the magnitude output $\hat{A}_{135}$ along lead 46. If a favorable comparison is made, the output along lead 46 is presumed to be valid. This output from the comparator 57 is fed to a bearing calculator 58 where it enables circuitry to compute bearing information indicated as $\beta'$ in FIG. 3, appearing along output lead 60.

A reference burst tracker 61 is provided with a tag signal input, along lead 62, derived from decoder 33a, as well as two additional inputs connected in parallel with leads 36 and 40 through gates 68. When the bearing filter 38 provides an enable signal along lead 70, burst tracker inputs 64, 66 are provided with magnitude and time information. The burst tracker 61 becomes operative only when main or auxiliary pulses are being transmitted from a ground station as manifest by an appropriate coded tag along input lead 62. The output 76 from reference burst tracker 61 carries information concerning the antenna rotation frequency ($\hat{\omega}$). Tracker output lead 77 carries the time of the last received main burst. This time information ($T_M$) and the antenna frequency information ($\hat{\omega}$) obtained from the burst tracker 61 are reference signals required for processing bearing data by the bearing tracker. In the event the "tag" along input lead 62 indicates that squitter bursts are being received, at a particular point in time, the reference burst tracker 61 discontinues operation. The high ratio of squitter bursts to main or auxiliary bursts permits the squitter bursts to update the bearing data quickly.

Bearing information ($\beta'$) appearing at the output of bearing calculator 58 is delivered to a display register 78 when intervening switch 83 completes a path between the bearing calculator 58 and the register 78. The state of switch 83 is determined by a select signal along switch input lead 82. The select signal will cause the path between calculator 58 and display register 78 to close when the number of pulses during a fixed time interval at input lead 36 causes counter 86 to exceed a preset threshold existing in comparator 88. If a variable threshold is desired, it may be provided along input lead 90 to the comparator 88. In the event that this time density of received pulses does not have a magnitude exceeding the threshold, the switch 83 changes its state to permit the signal at switch input lead 80 to be transmitted to the display register 78. The signal at lead 80 is an estimated bearing update for use during short periods when a ground station TACAN signal is not received by an aircraft. In order to understand how the estimated updated information is generated, continued reference is made to FIG. 3. The last contents of the display register 78 are fed, via lead 92, to a subtractor 94 which determines a $\Delta\beta$ value which is equal to the increment between the last stored $\beta$ value and the previous penultimate bearing value. This is fed to a low pass filter 96. The resultant smoothed output is stored in register 98. The output from the register 98 is then summed in summing circuit 100 with the last stored value in display register 78 to generate an estimated updated bearing value which refreshes the display register 78.

The bearing data stored in display register 78 is multiplied with a scale factor (104) in multiplier circuit 102. The result is fed, via lead 106, to the display 31a.

Figure 4:
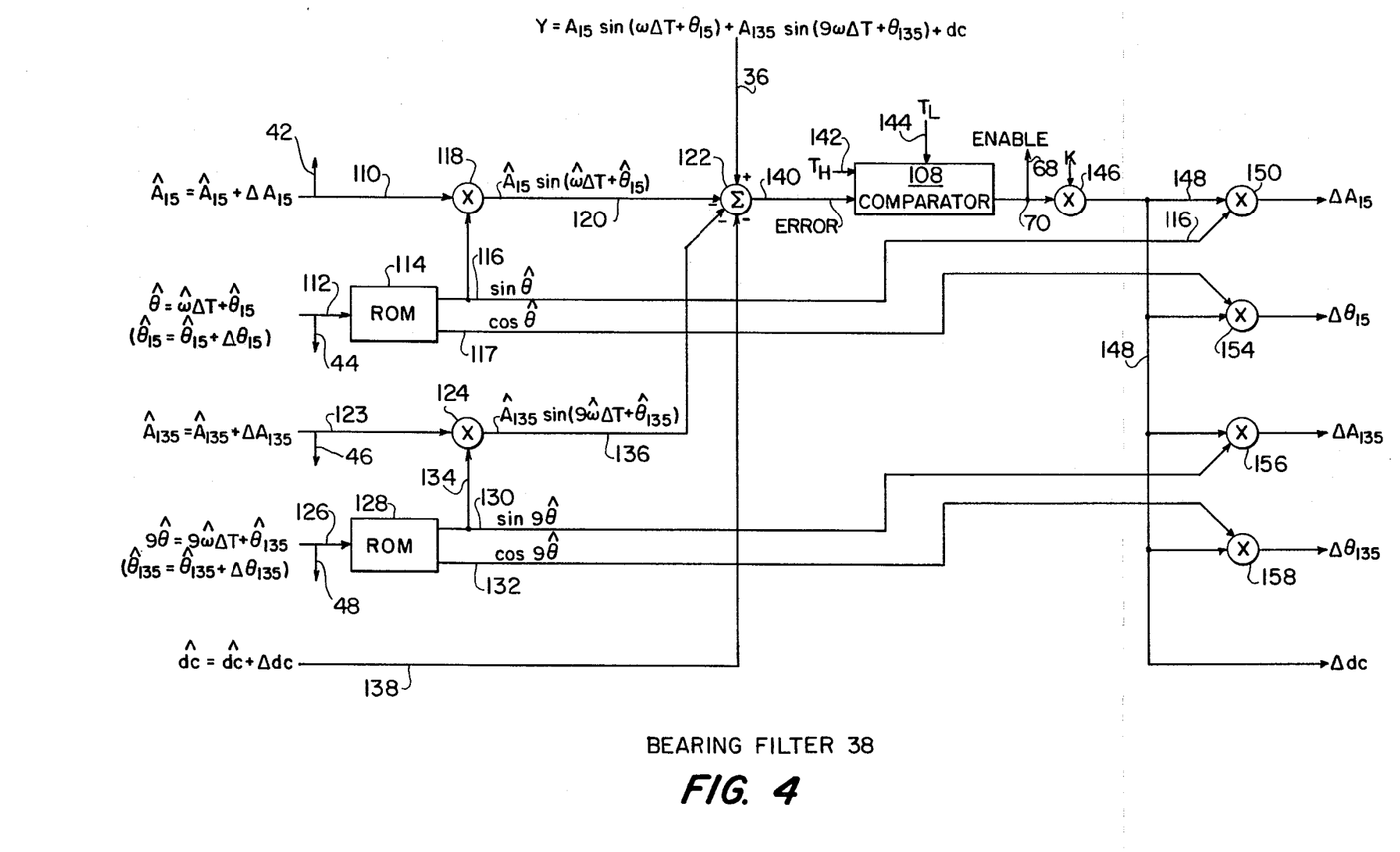
FIG. 4 is a block diagram of a bearing filter incorporated within the bearing tracker of FIG. 3.

FIG. 4 illustrates a block diagram for the bearing filter 38 of FIG. 3, the purpose of which is to achieve constant estimation and smoothing of amplitude and phase of the received signal envelopes. Viewing FIG. 4, the magnitude and phase outputs are deltas or changes in values which occur between new estimates being generated by the filter and old estimates generated on the prior iteration. The delta value is then used to correct a next iteration of envelope data processing. In this manner, filtering of the data is achieved thereby eliminating erratic or spurious received signals. The time constant of this filter is relatively short to avoid errors that would otherwise be incurred if a bearing rate were present. Further filtering is accomplished later in the bearing calculator 58. A comparator 108 is preferably preloaded with high ($T_H$) and low threshold ($T_L$) values along respective inputs 142 and 144 to establish a "window" for incoming data to pass for a positive comparison. This achieves amplitude screening and blocks very large and very small amplitude signals which would otherwise go through. If a favorable screening is achieved, an enable signal is generated at output lead 70 of comparator 108 for enabling gates 68 as previously explained in connection with FIG. 3. Estimated magnitude information, with respect to the 15 Hz envelope is created within the bearing filter and supplied as a bearing filter output on lead 42 in addition to being fed back for use in the next iteration along input lead 110. A present value of the magnitude information, at a present instant of time, is computed, through digital processing, to equal the last value plus the last delta or change between the last two processed values. This is indicated in FIG. 4 as $\hat{A}_{15}$.

Estimated phase information for the 15 Hz envelope is computed and provided as a bearing filter output on lead 44 and also fed to a ROM 114 along input lead 112. The value of $\hat{\theta}_{15}$ is employed in the equation indicated in FIG. 4 for computing $\hat{\theta}$. This, in turn, serves for establishing as a look-up table input in ROM 114 values of $\sin \hat{\theta}$ and $\cos \hat{\theta}$ along respective output leads 116 and 117. In the computation of $\hat{\theta}$, the value $\hat{\omega}$ is obtained from a last-stored value generated by the reference burst tracker 61 (FIG. 3). A multiplier 118 is connected to leads 110 and 116 to generate the value $A_{15} \sin (\hat{\omega}\Delta t + \hat{\theta}_{15})$, where $\Delta t$ is the time interval between the present pulse processed by the bearing filter and the last main burst. This resultant value is provided to a first input 120 to a digital summing circuit 122.

The calculated value for $\hat{A}_{135}$ is provided as a bearing filter output via 46, and also to multiplier 124 via 123. The calculated phase value $9\hat{\theta}$ is provided as a bearing filter output along 46 and also provided along input lead 126 to a ROM 128. The value of $9\hat{\theta}$ is dependent upon a calculation involving the phase information of the 135 Hz envelope, this being calculated in a similar fashion to that previously explained in connection with the input to ROM 114. A look-up table in the ROM generates the value of $\sin 9\hat{\theta}$ along lead 130 and $\cos 9\hat{\theta}$ along lead 132. The value of $\sin 9\hat{\theta}$ is then transmitted, along lead 134, to the multiplier 124, where $\sin 9\hat{\theta}$ is multiplied by $\hat{A}_{135}$ to produce the resultant value from the expression $\hat{A}_{135} \sin (9\hat{\omega}\Delta t + \hat{\theta}_{135})$ along lead 136 which furnishes a second input to the summing circuit 122. Finally, a computed value of the DC level of the received signal envelopes occurs along lead 138 where it provides a third input at 138 to the summing circuit 122. These three aforementioned inputs 120, 136 and 138 to the summing circuit 122 are compared with the present actual received value of value of the signal magnitude occurring along the input 36 to the summing circuit 122. The actual received magnitude is given by the expression:

$$Y = A_{15} \sin(\omega \Delta t + \theta_{15}) + A_{35} \sin(9\omega \Delta t + \theta_{135}) + dc.$$

A comparison is made between the actual measured value of magnitude and the corresponding value from the remaining three inputs to the summing circuit 122 so that an error value appears at the output 140 of the summing circuit 122. This error value is compared with the preset window in comparator 108 to achieve amplitude screening as previously explained. A valid output from comparator 108 is then multiplied, in multiplier 146 by a gain constant (k), less than unity. This reduces large fluctuations in an error signal but necessitates a relatively large number of iterations to achieve error correction.

The output 148 from the multiplier 146 is multiplied, in multiplier 150, by the value $\sin \hat{\theta}$ along lead 116 to provide the value $\Delta A_{15}$ which will then be fed back to the input 110 during a successive iteration. Similarly, the multiplier 154 multiplies the signal at lead 148 with the $\cos \hat{\theta}$ on lead 117 to achieve $\Delta \theta_{15}$. The same output along lead 148 is multiplied by $\sin 9\hat{\theta}$, in multiplier 156, to generate $\Delta A_{135}$. Multiplier 158 multiplies the value of $\cos 9\hat{\theta}$ (132) and the value on lead 148 to generate $\Delta \theta_{135}$. The output 148 is directly transferred, without multiplication, as the value $\Delta dc$. All delta values at the output of the filter of FIG. 4 are fed back to corresponding inputs to the filter during a successive iteration so that successive comparisons may be made with the actual measured magnitude Y.

Figure 5:
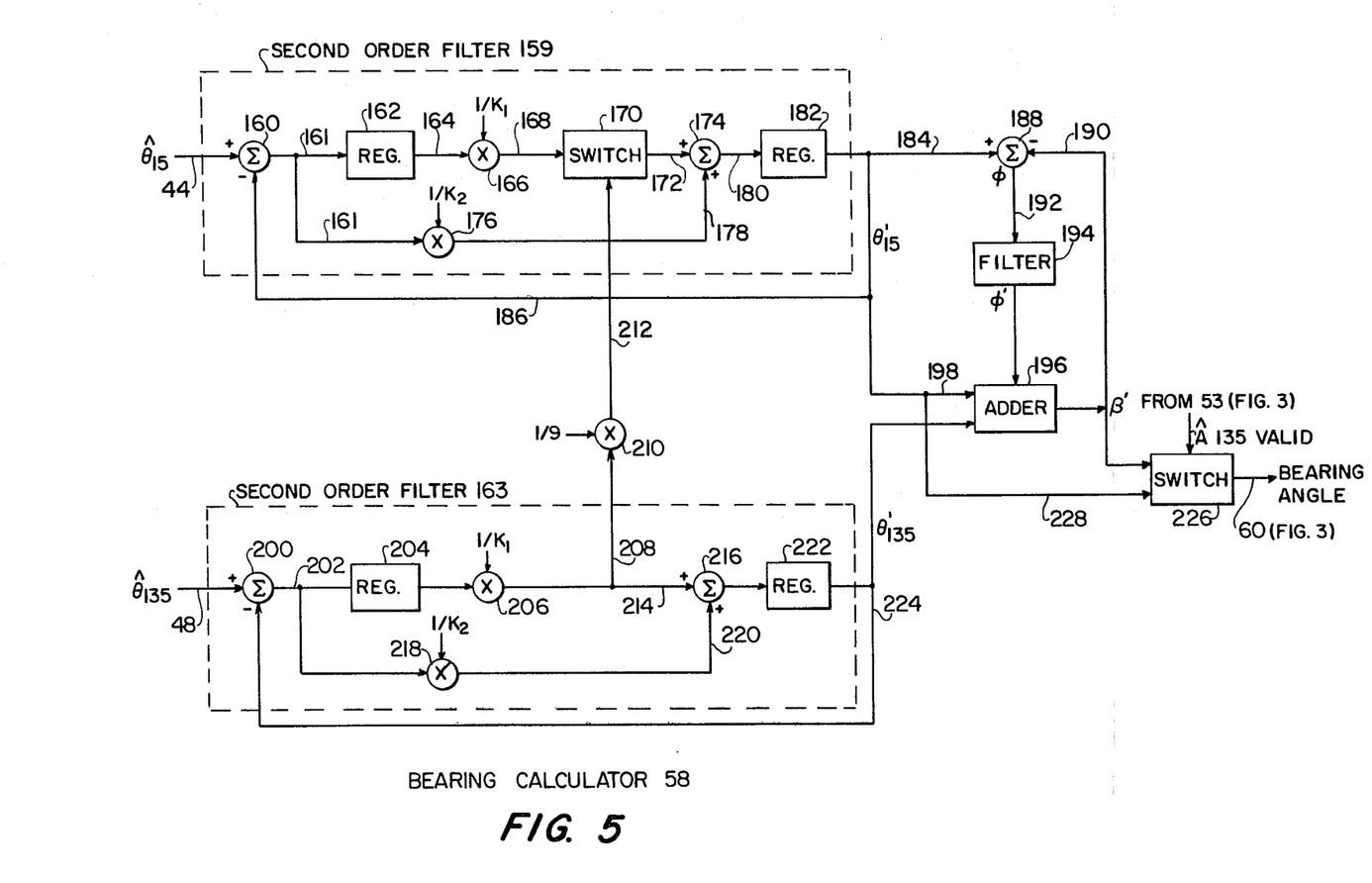
FIG. 5 is a detailed block diagram of a bearing calculator as employed in the bearing tracker of the present invention.

FIG. 5 illustrates, in block diagram form, the bearing calculator which computes bearing information from phase data provided by the bearing filter 38 (FIG. 3).

The figure illustrates the front end of the calculator as representing a first second order filter 159 which processes phase data, relative to the 15 Hz envelope. Another second order filter 163 achieves a comparable task for the bearing data, relative to the 135 Hz envelope. It should be understood that both filters 159 and 163 are preferably microprocessor implemented.

Bearing data $\hat{\theta}_{15}$, transmitted from the bearing filter 38 (FIG. 3) appears along lead 44 as a first input to a summing circuit 160. The output 161 of the summing circuit 160 is added to the contents of register 162 and thereafter appears at the register output 164 where it is multiplied by a constant $1/k_1$ in multiplying circuit 166. The resultant multiplied signal appears along lead 168 as a first input to switch 170. The switch is closed only when a 135 Hz signal is unavailable for reception. When this condition exists, information passes from multiplying circuit 166 to the summing circuit 174 via lead 172. When the 135 Hz signal is available for reception, this path is opened and information from lead 212 is diverted through switch 170 to the summing circuit 174. The output appearing along output 161 follows a parallel path through multiplier 176. The multiplier has a second input, namely constant $1/k_2$. The output from multiplier 176 is delivered, via lead 178 as a second input to the summing circuit 174. The output 180 from the summing circuit 174 is added to the contents of register 182. The output 184 contains filtered information of the bearing angle and is indicated by $\theta'_{15}$. This bearing angle information is fed back, via lead 186, to a second input of the summing circuit 160 to complete the structure of the second order filter 159.

The output 184 of the filter 159 serves as a first input to summing circuit 188. A second input, along lead 190, is the bearing angle as computed by adder 196, as will be presently explained. The output from the summing circuit 188 carries a correction angle between $\theta'_{15}$ and the bearing angle output ($\beta'$) from the entire bearing calculator. This correction angle, indicated as $\phi$, is fed, via lead 192, to a low pass filter 194. The resultant output from filter 194, represented by $\phi'$ represents a smoothed output. The adder 196 calculates the bearing angle ($\beta'$) after operating upon the input data. The adder 196 not only receives $\phi'$ from filter 194 but also an input along lead 198 which represents $\theta'_{15}$ from the second order filter 159. A third input to the adder 196 is indicated along lead 224 as $\theta'_{135}$, representing bearing data from the 135 Hz signal as generated at the output of the bottom second order filter 163. In order to appreciate how $\theta'_{135}$ is generated, continued reference is made to FIG. 5.

The input $\hat{\theta}_{135}$ from the bearing filter 38 (FIG. 3) occurs along input lead 48 of the summing circuit 200, similar to the summing circuit 160 of the first-mentioned second order filter 159. Indeed, from this point on, most of the components of the second order filter 163 are comparable to that of filter 159. Thus, register 204 and multiplier 206 assist in generating a filtered bearing angle output as computed from a 135 Hz signal. The output from multiplier 206 is routed, via lead 208, to a multiplier 210 which multiplies the signal thereat by a factor of 1/9. The purpose of such multiplication is to generate a bearing rate signal along lead 212 from the multiplier output, having a magnitude of the same order as that appearing along lead 168 in the second order filter 159. The factor of 1/9 is selected because the ground beacon antenna (not shown) of a conventional TACAN system employs one main rod generating the 15 Hz signal and nine auxiliary rods generating the 135 Hz signal. The information along lead 212 is transferred to the summing circuit 174 when a 135 Hz signal is available in order to lock the two second order filters together in the desired 9:1 ratio. The information from the output of multiplier 206 is fed, along lead 214, to the summing circuit 216, at a first input thereof. A second input to the summing circuit 216 is obtained when the output from summing circuit 200 is multiplied, at multiplier 218, with a constant $1/k_2$, the output from the multiplier providing a second input 220 to the summing circuit 216. Register 222 accumulates the output from the summing circuit 216 and generates a filtered output representing nine times the bearing angle.

It is $\theta'_{135}$ which presents a third input to the adder 196 as previously mentioned. The bearing angle output from the adder 196 and thus the bearing calculator 58 may be expressed by the combining equation:

$$\beta' = \frac{\theta'_{135}}{9} + 40 \times \text{Integer}\left(\frac{\theta'_{15} - \phi' - \frac{\theta'_{135}}{9} + 20}{40}\right)$$

With continued reference to FIG. 5, the switch 226 has as its first input, the output from adder 196. When the 135 Hz signal has been confirmed as properly received, as explained in connection with comparator 57 (FIG. 3), the output lead 60, from switch 226 carries the bearing angle $\beta'$. However, in the event that the 135 Hz signal has not been received, the state of switch 226 is changed and instead $\theta'_{15}$ routed from register 182, lead 198 and lead 228, passes through switch 226 and appears at the switch output lead 60 as the bearing angle. To summarize, the bearing angle appearing at the final lead 60 of the accumulator shown in FIG. 5 will be the result of the combining equation, performed by adder 196, but only when a 135 Hz signal is received. When the signal is not received, an estimation of the bearing angle is provided by the filtered bearing angle $\theta'_{15}$ generated from the 15 Hz input signal to the bearing calculator.

Figure 6:
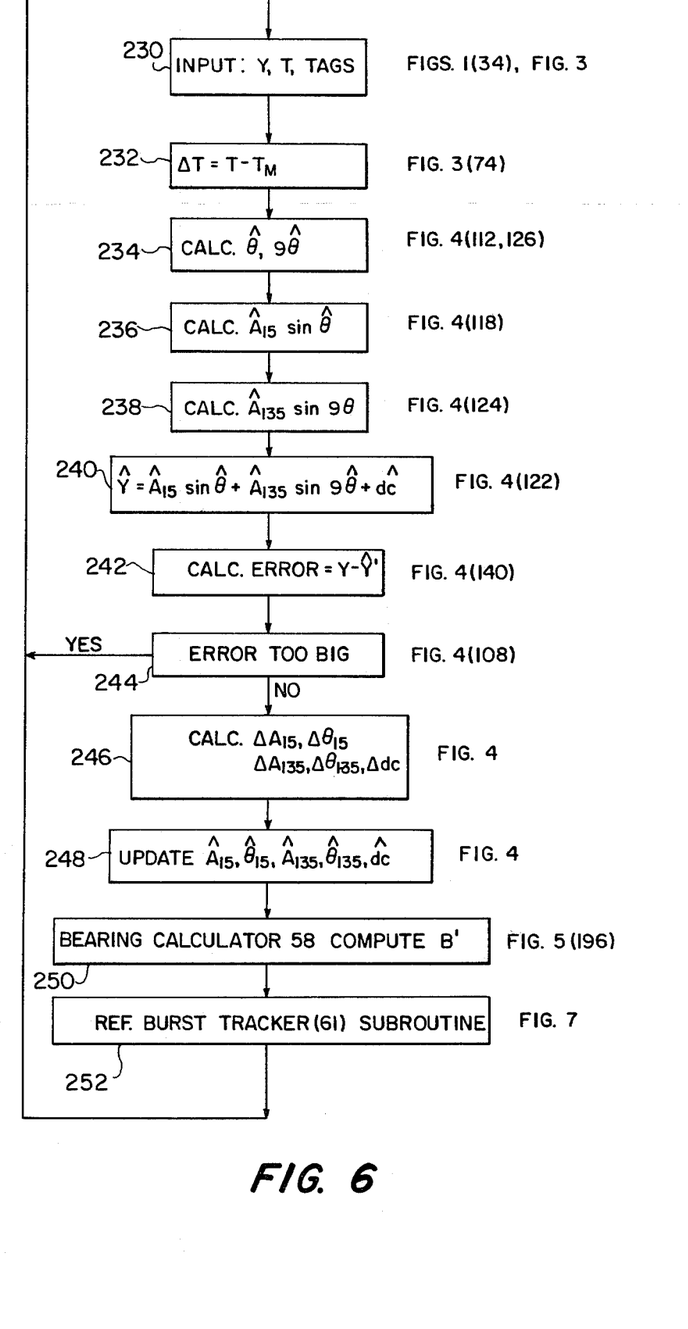
FIG. 6 is a flow chart of the basic operation of the present invention.

FIG. 6 shows a basic flow chart for the invention and is intended to facilitate a better understanding of the invention's operation. The individual steps are referred to by reference numerals 230–252 and to the right of each box is a corresponding block diagram figure and block (where appropriate) where a particular step is carried out. The end result of the flow chart is to produce bearing data.

This process is initiated at step 230 by providing amplitude, time and tag information to the bearing tracker 34 and more particularly illustrated in FIG. 3. In step 232 $\Delta T$ is computed. This is implemented at the output 74 of subtractor 72 in FIG. 3. Step 234 indicates the calculation of $\hat{\theta}$ and $9\hat{\theta}$, these being introduced to the bearing filter 38 at input leads 112 and 126 in FIG. 4. It should be understood that a microprocessor implementation of the invention facilitates the computation of these values from $\hat{\omega}$, $\Delta T$, $\hat{\theta}_{15}$ and $\hat{\theta}_{135}$. Step 236 indicates the calculation of $\hat{A}_{15} \sin \theta$ as the result of a computation in multiplier 118. Step 238 indicates a comparable calculation by multiplier 124 in FIG. 4. Step 240 indicates the computation of the calculated magnitude resulting from the summing circuit 122 in FIG. 4. The error between the calculated magnitude and actual magnitude, as introduced along lead 36 (FIG. 4) results from step 242.

In order to continue with the flow chart, a check must be made to see whether the error is inside the "window" defined by the threshold level preset in comparator 108. This is referenced as step 244 in the flow chart. In the event the error is too great, there is a return to the initial step 230 for a new iteration of the flow chart. If the error is within the preset window, the delta outputs of the bearing filter 38 (FIG. 4) are obtained at step 246 and the subsequent step 248 is completed whereby the delta values are fed back to the inputs of the bearing filter 38 to update the magnitude and bearing data thereat.

Step 250 indicates that bearing ($\beta'$) is computed as a result of the combining equation as implemented in accumulator 58 (FIG. 4).

Following the generation of bearing data, the microprocessor implemented program proceeds to a subroutine for reference burst tracker 61 (FIG. 3) which, as previously mentioned, has the primary task of updating $\hat{\omega}$ and $T_M$, the latter being necessary to calculate $\Delta T$ required in step 232. The burst tracker subroutine is explained in connection with FIG. 7. At the completion of the reference burst tracker subroutine at step 252, the program returns to the initial step 230.

Figure 7:
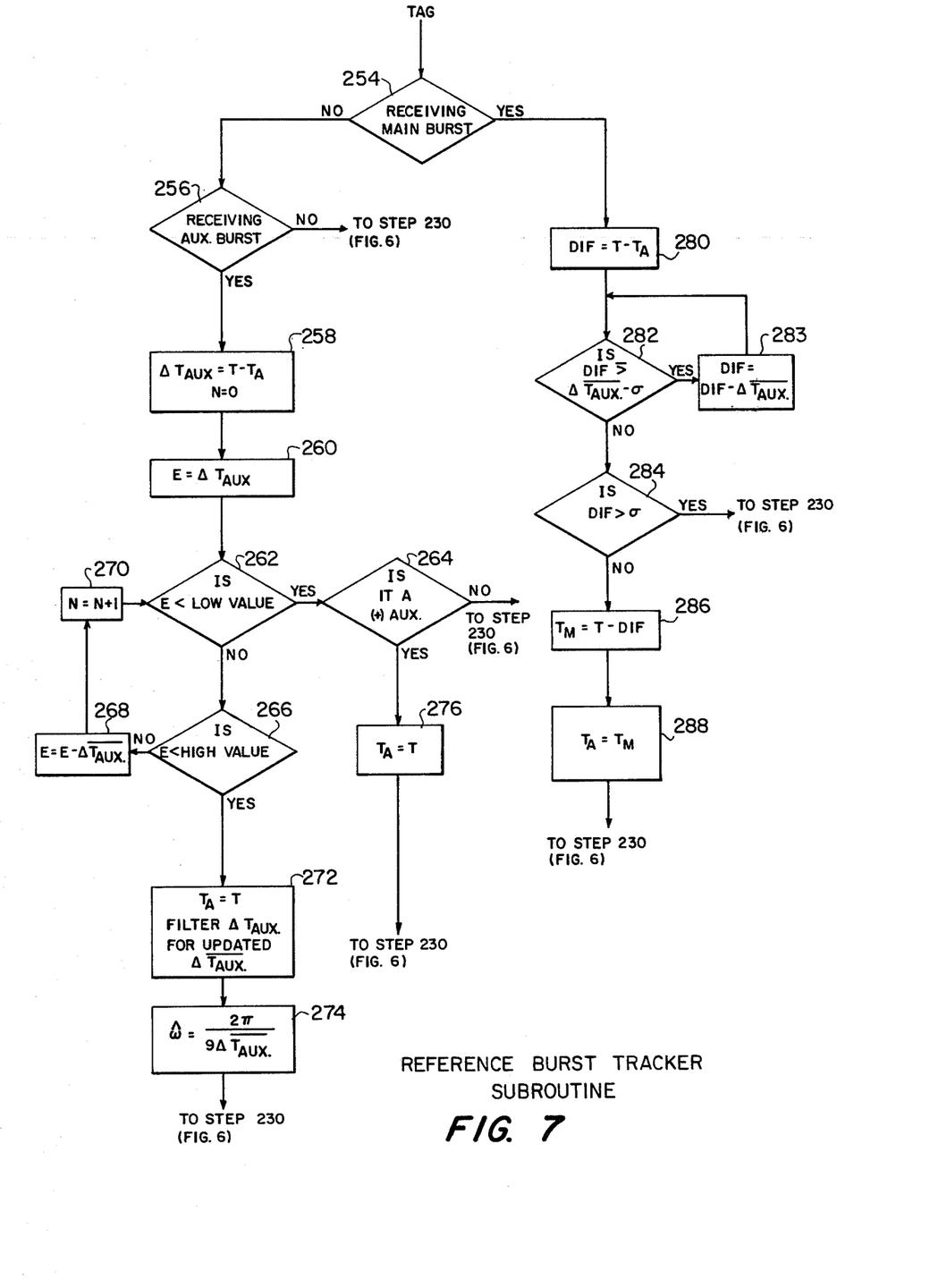
FIG. 7 is an operational flow chart of a reference burst tracker incorporated in the bearing tracker of FIG. 3.

FIG. 7 is a flow chart for the reference burst tracker (61) operation which was generally indicated by reference numeral 252 in FIG. 6. As previously mentioned in connection with FIG. 3, the reference burst tracker 61 only becomes operative when the tag input indicates that a main or auxiliary pulse is being received at a particular instant of time. This serves to update the data regarding ω and the time reference $T_M$. When the tag input indicates that a squitter burst is being received, the reference burst tracker is inoperative but the bearing filter 38 functions to update bearing data in accordance with the flow chart just explained in connection with FIG. 6.

Viewing FIG. 7, tag data is first reviewed at step 254 to determine whether the signal being received is a main burst. If it is not, the flow chart proceeds along the left branch to step 256 wherein the tag is queried to see whether it corresponds to an auxiliary burst. If the answer is again in the negative, the operation transfers to step 230 (FIG. 6). If the answer at step 256 is affirmative, the flow chart proceeds to step 258 wherein $\Delta T_{AUX}$ is computed from the present instant of time (T) minus the time that the last auxiliary burst occurred. A counter (N) is set to zero initially, and is used to count the number of missed auxiliary bursts during the time lapse at $\Delta T_{AUX}$. The value of N is later used by filter 272 to obtain $\overline{\Delta T_{AUX}}$, the average value of $\Delta T_{AUX}$. At step 260, an error is equated to the value of $\Delta T_{AUX}$. The error (E) is queried at step 262 to determine whether it is below a preselected low value. This step in conjunction with step 266 determines whether the error is within a value "window". If the result from step 262 is positive, a further check is made at step 264 where the auxiliary burst is tested for polarity. This check is determined even though the error (E) is below the low value because the occurrence of a positive auxiliary burst is considered more important than the error check because ghost signals could cause the error (E) to fall within the window. A positive auxiliary burst is any positive output from the converter 27a (FIG. 1) resulting in equating T and $T_A$ at step 276. Returning to step 264, if the auxiliary burst is negative, the flow chart transfers to the initial step 230 of the FIG. 6 flow chart.

Returning to step 262, the low value against which the error (E) is measured may be expressed as $P_{a-\sigma}$, wherein σ has a preselected threshold value and wherein $P_a$ equals the period of the 40 degrees auxiliary signal which is equal to 1/135. Step 266 determines whether the error (E) is less than a high value, the latter being expressable as $P_{A+\sigma}$. In the event the determination at step 266 is in the negative, the error is reduced at step 268 by the quantity $\overline{\Delta T_{AUX}}$. This causes the counter to increment by one at step 270 to indicate a missed auxiliary burst and from there the flow chart reiterates to step 262. If a positive determination results from step 266, step 272 is initiated wherein the present auxiliary $T_A$ is set equal to the present value of time (T). By averaging $\Delta T_{AUX}$ to include the last-obtained value of this quantity, an updated average ($\overline{\Delta T_{AUX}}$) is obtained. With this, ω̂ can be computed at step 274. This value of ω̂ may now be utilized at the input of bearing filter 38 as explained in connection with FIG. 4. Returning to the original step 254, if the tag input indicated that a main burst was being received, the flow chart proceeds along the right branch. The first step in this branch is the determination of the quantity "DIF", which is equal to $T - T_A$ as indicated in step 280. T is the present time, while $T_A$ is the time during which the last received auxiliary burst occurred. At step 282, "DIF" is checked to determine whether it is greater or equal than the quantity $\Delta T_{AUX}$ minus a preselected threshold value (σ). The purpose of this step is to determine whether the main burst is occurring 40 degrees from the last auxiliary burst. If a positive determination is made, the quantity "DIF" is set equal to the previously computed value of DIF in step 280 from which is subtracted $\Delta T_{AUX}$. The flow chart then reiterates from step 283 to step 282 until a negative determination is made at step 282. When this occurs, step 284 is reached and the value of "DIF" is checked to see whether it is greater than the preselected threshold (σ). If it is, the flow chart transfers to step 230 of the FIG. 6 flow chart. If it is not, the flow chart proceeds to step 286 wherein $T_M$ is set equal to T−DIF. DIF is a measurement of the misalignment of the actually occurring main burst relative to the moment where it should have occurred. $T_M$ is the moment at which the main burst should occur.

The final step is the equating of $T_A$ with $T_M$ was illustrated in FIG. 3 as an output from the reference burst tracker 61 and occurring along lead 77. Accordingly, the right branch of the flow chart provides time data $T_M$ while the left branch of the flow chart provides frequency information (ω̂), both quantities being utilized by the bearing filter 38 (FIG. 4) as discussed.

It should be understood that the invention is not limited to the exact details of construction shown and described herein for obvious modifications will occur to persons skilled in the art.

We claim:

1. In a TACAN system, a method for generating bearing angle information comprising the steps:

receiving a ground station signal having higher and lower frequency components;

determining the time of arrival (T) and magnitude (Y) of main, auxiliary, and squitter bursts contained in the higher frequency received signal;

decoding the higher frequency signal to determine the type of burst being received at a given instant of time and generating a Tag signal therefrom;

computing the time difference between a burst time of arrival and the time of a last main pulse;

measuring the time interval between a present auxiliary burst and a previous auxiliary burst;

computing a reference frequency dependent upon the measured time interval;

computing updated phase angles of the respective higher and lower received signals;

computing a phase angle θ of the received signal as a function of the reference frequency, the measured time interval, and the updated phase angles of the higher and lower signals;

performing a second order filtering of the higher and lower phase angles of the received signal thereby generating respective phase angle outputs $\theta'_1$ and $\theta'_2$;

obtaining a filtered phase angle $\phi'$ as a function of the difference between $\theta_1$ and the bearing angle;

computing an updated bearing angle ($\beta'$) in accordance with the equation:

$$\beta' = \frac{\theta'_1}{9} + 40 \times \text{Integer}\left(\frac{\theta'_1 - \phi' - \theta'_2/9 + 20}{40}\right)$$

2. The subject matter set forth in claim 1 together with the steps of updating the reference frequency and the measured time interval only during the occurrence of a Tag corresponding to an auxiliary or main burst.

3. The subject matter set forth in claim 1 together with the step of computing updated magnitude values of the lower and higher frequency components.

4. The subject matter set forth in claim 3 wherein the magnitude values are compared with preselected threshold values to determine whether the received signal is valid.

5. In a digital based Tacan system for determining aircraft bearing angle, the system having a receiver producing digital time of arrival and magnitude data incident to a Tacan bearing signal from a ground station, apparatus to compute bearing to the ground station comprising:
   (a) a reference burst tracker for developing an estimate of the frequency of the bearing signal;
   (b) a bearing filter receiving as inputs the time of arrival and magnitude data and said estimate of the frequency for computing filtered bearing magnitude and phase data therefrom;
      (i) means to estimate components of bearing magnitude and phase;
      (ii) means to compute from said estimates an estimate of the magnitude of the bearing signal;
      (iii) means to sum the estimate of magnitude with the received bearing magnitude to develop an error signal;
      (iv) means for computing individual magnitude and phase error signals from said error signal, said individual error signal being supplied to said means to estimate; and
   (c) means, having as inputs said computed bearing phase estimate for calculating bearing angle data.

6. In a Tacan system having a receiver producing time of arrival and magnitude data from a ground station signal having low and high frequency components, the improvement comprising:
   (a) a reference burst tracker having time of arrival and magnitude data at the input thereof for computing predetermined frequency and time reference information therefrom during certain portions of a ground station signal;
   (b) bearing filter means receiving the time of arrival and magnitude data and computing filtered magnitude and phase data including:
   $\hat{A}_1$ = magnitude of low frequency component $\hat{A}_2$ = magnitude of high frequency component $\hat{\theta}_1$ = phase of low frequency component $\hat{\theta}_2$ = phase of high frequency component;
   (c) means transmitting the frequency and time reference information from said reference burst tracker to the bearing filter for enabling calculation of said filtered data;
   (d) accumulator means for computing bearing angle in accordance with a predetermined equation having $\hat{\theta}_1$ and $\hat{\theta}_2$ as parameters;
   (e) means for detecting the occurrence of the magnitude of at least one frequency component with predetermined threshold values, and providing an output indicative of a valid received signal; and
   (f) mean coupling the accumulator means to an output of the system, in response to said output.

7. The subject matter set forth in claim 6 wherein the bearing filter means comprises feedback means for comparing computed data with actual received data for generating error signals therebetween, the error signals being utilized for updating subsequent computed data.

8. The subject matter of claim 6 wherein the accumulator means includes:
   first and second inputs for $\hat{\theta}_1$ and $\hat{\theta}_2$;
   second order filter means respectively operating on the $\hat{\theta}_1$ and $\hat{\theta}_2$ components for generating filtered components $\theta'_1$ and $\theta'_2$;
   means for comparing the computed bearing angle with $\theta'_1$ and generating a filtered error signal $\phi'$; and
   means for computing an updated bearing angle ($\beta'$) in accordance with the equation $$\beta' = \frac{\theta'_2}{9} + 40 \times \text{Integer}\left(\frac{\theta'_1 - \phi' - \theta'_2/9 + 20}{40}\right)$$

* * * * *